(12) United States Patent
Dallas et al.

(10) Patent No.: US 6,676,305 B2
(45) Date of Patent: Jan. 13, 2004

(54) APPARATUS AND METHOD OF ALIGNING OPTICAL FIBERS TO OPTICAL DEVICES

(75) Inventors: Joseph L. Dallas, Maple Glen, PA (US); Angelique X. Irvin, Radnor, PA (US); Robert W. Irvin, Radnor, PA (US); Ralph S. Jameson, Orefield, PA (US); William A. Mamakos, Laurel, MD (US)

(73) Assignee: Coviant, Inc., Horsham, PA (US)

( * ) Notice: Subject to any disclaimer, the term of this patent is extended or adjusted under 35 U.S.C. 154(b) by 20 days.

(21) Appl. No.: 10/058,342

(22) Filed: Jan. 28, 2002

(65) Prior Publication Data

US 2003/0142926 A1 Jul. 31, 2003

(51) Int. Cl.[7] ................................................. G02B 6/36
(52) U.S. Cl. .......................................... 385/91; 385/147
(58) Field of Search ............................ 385/88–92, 147; 257/774; 439/77; 174/35 R

(56) References Cited

U.S. PATENT DOCUMENTS

| 5,339,876 | A |   | 8/1994  | Mattern            |         |
|-----------|---|---|---------|--------------------|---------|
| 5,482,585 | A |   | 1/1996  | Ota et al.         |         |
| 5,497,438 | A |   | 3/1996  | Ishikawa et al.    |         |
| 5,499,309 | A |   | 3/1996  | Kozuka et al.      |         |
| 5,559,915 | A |   | 9/1996  | DeVeau             |         |
| 5,566,262 | A |   | 10/1996 | Yamane et al.      |         |
| 5,656,120 | A |   | 8/1997  | Ota et al.         |         |
| 5,700,987 | A |   | 12/1997 | Basavanhally       |         |
| 5,708,741 | A |   | 1/1998  | DeVeau             |         |
| 5,715,341 | A |   | 2/1998  | Osugi et al.       |         |
| 5,790,731 | A |   | 8/1998  | DeVeau             |         |
| 5,930,600 | A |   | 7/1999  | Seelert et al.     |         |
| 5,946,099 | A |   | 8/1999  | Ota et al.         |         |
| 5,970,192 | A |   | 10/1999 | Osugi et al.       |         |
| 6,027,253 | A |   | 2/2000  | Ota et al.         |         |
| 6,033,515 | A |   | 3/2000  | Walters et al.     |         |
| 6,084,178 | A | * | 7/2000  | Cromwell           | 174/35 R |
| 6,103,344 | A |   | 8/2000  | Ota et al.         |         |
| 6,146,025 | A |   | 11/2000 | Abbink et al.      |         |
| 6,160,937 | A |   | 12/2000 | Fukuyama et al.    |         |
| 6,181,864 | B1|   | 1/2001  | Jang et al.        |         |
| 6,195,495 | B1|   | 2/2001  | Ota et al.         |         |
| 6,215,944 | B1|   | 4/2001  | Ota et al.         |         |
| 6,215,945 | B1|   | 4/2001  | Fukuyama et al.    |         |
| 6,231,244 | B1|   | 5/2001  | Fukuyama et al.    |         |
| 6,243,518 | B1|   | 6/2001  | Lee et al.         |         |
| 6,304,708 | B1|   | 10/2001 | Fukuyama et al.    |         |
| 6,462,419 | B1| * | 10/2002 | Asai               | 257/774 |
| 2002/0137369 | A1 | * | 9/2002 | Edwards et al.    | 439/77 |

* cited by examiner

Primary Examiner—Akm Enayet Ullah
(74) Attorney, Agent, or Firm—Cantor Colburn LLP

(57) ABSTRACT

A multi-fiber alignment system is provided for actively aligning optical fibers to an optical waveguide base on alignment status between each optical fiber and a corresponding optical device. Each of the optical fibers is held by bonding agent on a thermal pad from which radiation melts the bonding agent during adjustment of the optical fiber, and the optical fiber is fixed in its position by solidifying the bonding agent when being accurately aligned to a corresponding optical device.

31 Claims, 4 Drawing Sheets

APPARATUS AND METHOD OF ALIGNING OPTICAL FIBERS TO OPTICAL DEVICES

BACKGROUND

The present invention relates to optical fibers and their alignment, and more particularly, to a method and apparatus for actively aligning optical fibers to optical devices.

In practical fiber optic systems, transmission of light between optical fibers and any optical device requires careful alignment and tight tolerances. A mismatched junction at the ends of two connected optical fibers may cause loss of transmitting light. When some light is lost, such loss causes attenuation of the signal to be transferred.

Referring to FIG. 1, an exploded view is provided for illustrating a typical multi-fiber connector. A multi-fiber connector 100 has an upper plate 101 and a lower plate 103 each of which has V-grooves 104, 105 on its surface. To connect the first set of optical fibers 107 with the second set of optical fibers 109, the optical fibers 107, 109 are slipped into the respective V-grooves 105 on the lower plate 103 from the opposite directions. Then, the upper plate 101 with the V-grooves 104 each matching with the respective V-grooves 105 of the lower plate 103 is applied on the top of the optical fibers 107, 109. As a result, the ends of two optical fibers are mated with one another in corresponding V-grooves 104, 105.

A limitation in conventional multi-fiber connectors employing V-grooves 104, 105 is the need for tight tolerances in the V-grooves 104, 105. This limitation will be described in detail with reference to FIG. 2A.

FIG. 2A is a cross-sectional view of the multi-fiber connector 100 in FIG. 1. Each of the optical fibers 201 is placed in a space formed by the corresponding V-grooves 104, 105 of the upper and lower plates 101, 103. The conventional multi-fiber connector 100 also employs adhesive material 115 to fix the optical fibers 201 between the V-grooves 104, 105 and to attach the upper and lower plates 101, 103 to each other. Each of the optical fibers 201 maintains physical contact with the corresponding V-grooves 104, 105. Thus, the shape and dimension of the matching V-grooves 104, 105 determine the position of an optical fiber held between the matching V-grooves 104, 105.

FIG. 2B illustrates the connecting section of a typical planar waveguide device 220 comprising a planar substrate 210 and a plurality of optical waveguides 211 disposed thereon. This connecting section can be mated with a multi-fiber connector to couple light from each of the waveguides 211 into each corresponding optical fiber 201. The mating of the connecting section and the multi-fiber connector is typically used to introduce light into the waveguides 211, or to retrieve light therefrom. In a typical use, the waveguides 211 will transmit the light to, or return the light from, an optical device (not shown) that has been formed on the substrate 210.

As previously noted, any deviation in the alignment of optical fibers affects light transmission of the optical fibers. Such deviation or inaccuracy of alignment and positions of the optical fiber cores is mainly caused by factors as follows:

First, the optical fiber cores may be misaligned due to unevenly applied pressure on the upper substrate. When the upper and lower substrates are bonded to each other by pressing the upper substrate toward the lower substrate, pressure applied on the upper substrate should be maintained to have the same force over the entire area. Since positions of the optical fiber cores are determined after bonding the upper and lower substrates to each other, unevenly or incompletely applied pressure on the upper substrate may cause misalignment of the optical fiber cores.

Second, misalignment of the optical fiber cores may also be caused by an error in forming the V-grooves on the substrates. The V-grooves should be spaced relative to each other and should have a predetermined distance (or height) from the bottom of the lower plate so that the optical fibers arranged on the V-grooves may be fixed at their target positions. If there is any error in the space between the V-grooves and/or the distance from the bottom of the lower plate, the optical fibers arranged on the V-grooves may deviate from the target positions so as to cause misalignment of the optical fiber cores.

Finally, the optical fiber cores may be misaligned due to an error in their concentricity. It is assumed in fabrication of the optical fiber arrays that an optical fiber core is centered on the corresponding optical fiber. However, in fabrication of optical fibers, concentricity of the optical fiber cores may be failed. In this case, the optical fiber cores may be misaligned even though pressure on the upper substrate is evenly applied and the V-grooves are properly spaced each other and have a predetermined depth.

Further, in the configuration illustrated in FIG. 2B, there may be some error in the position of each of the waveguides on the planar waveguide device. When the multi-fiber connector is mated with the planar waveguide device the error in the waveguide position will create an error in the coupling of the waveguide to the corresponding optical fiber, and create a loss of optical signal.

Therefore, there remains a need for a method of aligning multiple optical fibers with high accuracy so that the optical fiber cores are precisely aligned with optical devices or waveguides disposed in connection with the optical fibers.

BRIEF SUMMARY

In a first aspect of the present invention a method for actively aligning optical fibers to optical waveguides. The method includes providing a base substrate on which the optical devices are arranged; forming on the base substrate thermal pads each of which is disposed in alignment with corresponding one of the optical devices; depositing a bonding agent on the respective thermal pads; selectively activating the thermal pads so that selected thermal pads generate heat to melt the bonding agent thereon; placing the optical fibers on the respective thermal pads, optical fibers on the selected thermal pads are surrounded by the melted bonding agent; adjusting the optical fibers on the selected thermal pads to be aligned to the respective optical devices; and solidifying the bonding agent on the selected thermal pads by inactivating a heat source directed to the selected thermal pads.

In one embodiment, the selectively activating step includes providing electrical connections between a current source and the respective thermal pads; and controlling connection and disconnection of the electrical connections based on alignment status between each optical fiber and a corresponding optical waveguide. In another embodiment, the step of forming the thermal pads includes forming heating pads on the base substrate; providing a first electrical connection between a current source and the respective heating pads, wherein the heating pads are commonly connected to the first electrical connection; and providing a second electrical connection between the current source and the respective heating pads, each of the heating pads being connected to the second electrical connection through a switching device.

In a second aspect of the present invention, an apparatus for aligning a plurality of optical fibers to a plurality of optical waveguides comprises a base substrate, thermal pads formed on the top surface of the base substrate and connected to a current source, and solder deposited on the respective thermal pads, wherein each of the optical fibers aligned to a corresponding optical waveguide is surrounded by the solder on corresponding one of the thermal pads, wherein the thermal pads melt the solder thereon when current is provided to the thermal pads from the current source.

In one embodiment, each of the thermal pads is preferably connected to the current source through a switching device for controlling supply of current to a corresponding thermal pad, wherein the switching device may be turned on when a corresponding optical fiber is adjusted to be aligned to a corresponding optical waveguide, and turned off when the corresponding optical fiber is aligned to the corresponding optical waveguide.

In an alternative embodiment, the apparatus includes positioners for adjusting positions of the respective optical fibers in response to a first feedback signal; switches for controlling supply of current to the respective thermal pads in response to a second feedback signal, light detectors associated with the respective optical waveguides, each of which detects light transmitted through corresponding one of the optical waveguides, power meters each for measuring the amount of light detected by corresponding one of the light detectors; and a computer for receiving outputs from the respective power meters and providing the first feedback signal to the respective positioners and the second feedback signal to the respective switches.

BRIEF DESCRIPTION OF THE DRAWINGS

This disclosure will present in detail the following description of preferred embodiments with reference to the exemplary drawings wherein like elements are numbered alike in the several FIGURES.

DETAILED DESCRIPTION OF THE PREFERRED EMBODIMENTS

Some embodiments of the invention will now be described in detail in the following examples.

Figure 1:
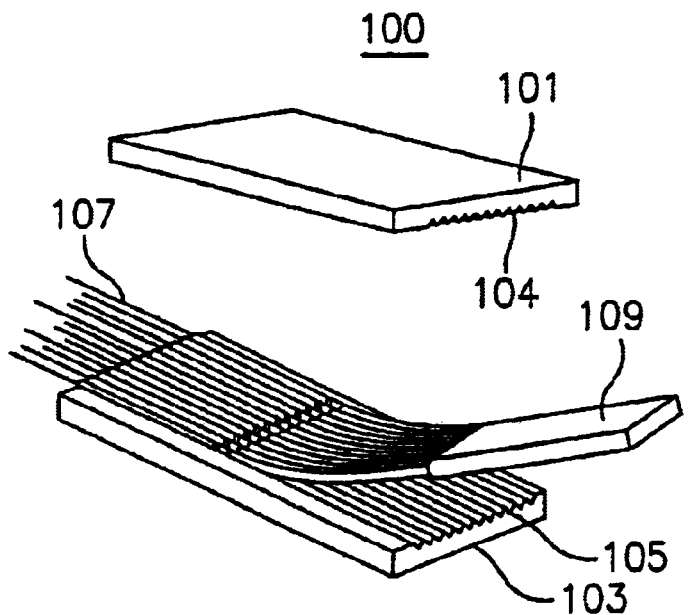
FIG. 1 is an exploded view of a multi-fiber connector.
Figure 2A:
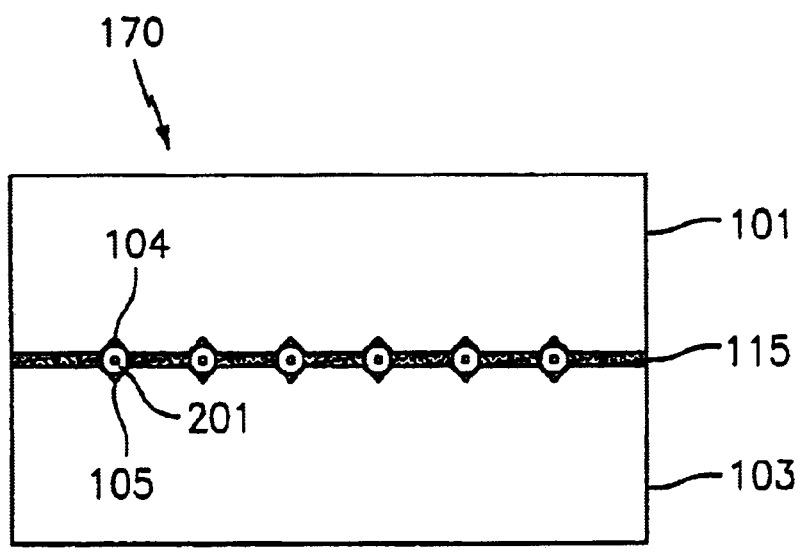
FIG. 2A is a cross-sectional view of the multi-fiber connector of FIG. 1.
Figure 2B:
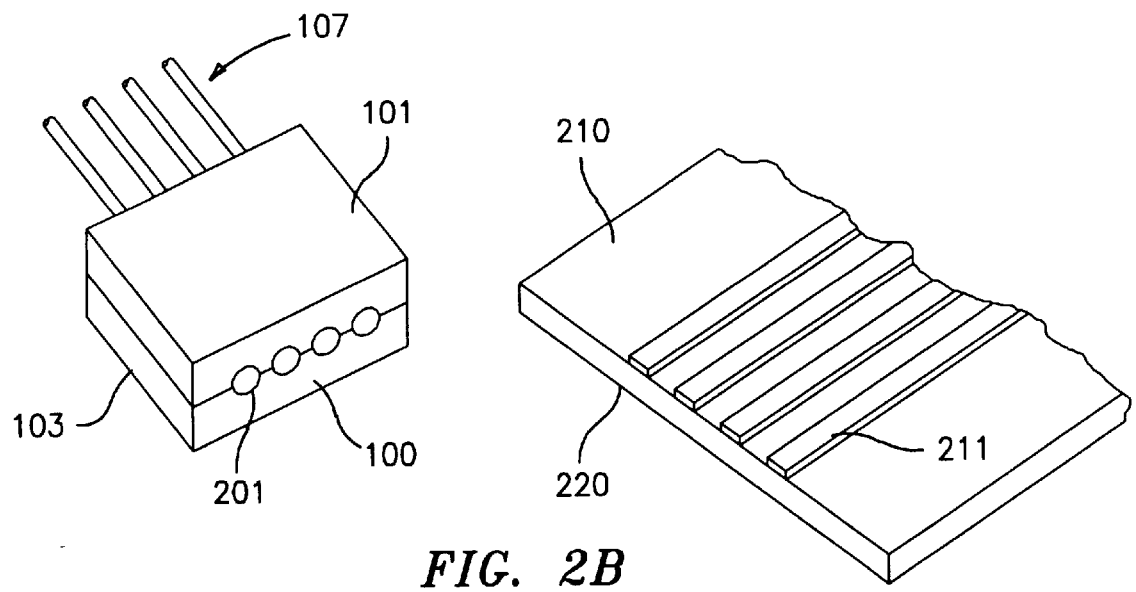
FIG. 2B is a perspective view of the multi-fiber connector of FIG. 2A and a connecting section of a typical planar waveguide device.
Figure 3A:
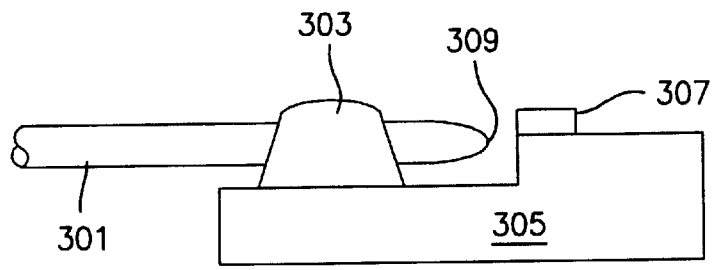
FIG. 3A is a side view of an alignment device for a single mode optical fiber.
Figure 3B:
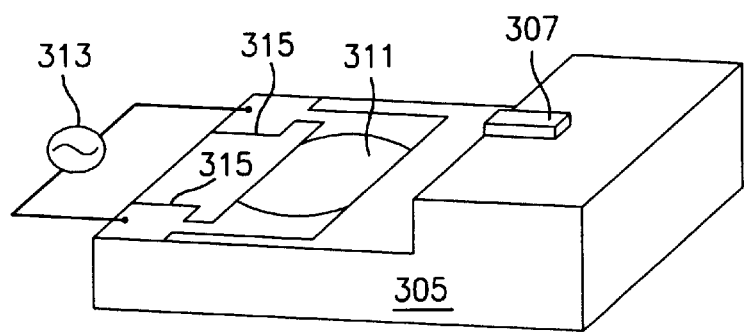
FIG. 3B is a perspective view of the alignment device of FIG. 3A.

FIGS. 3A and 3B are perspective and side views, respectively, of a conventional alignment device applicable to a single mode optical fiber. Referring to FIG. 3A, an optical fiber 301 is held with solder 303 deposited on a substrate 305. The solder 303 is solidified after the optical fiber 301 is aligned to a laser chip 307. To align the lens 309 to the laser chip 307, position of the optical fiber 301 is adjustable while the optical fiber 301 is in the molten solder 303.

Referring to FIG. 3B, a thermal pad 311 is metallurgically bonded to the surface of the substrate 305. The thermal pad 311 may be a resistive thin film which serves as a heater at the time that current flows there through. The solder 303 (referring to FIG. 3A) is deposited on the surface of the thermal pad 311. The thermal pad 311 is connected to a current source 313 through electric contact pads 315.

When the current source 313 is activated, the thermal pad 311 generates heat produced from internal power dissipation so that the solder 303 deposited on the thermal pad 311 is melted by the heat. At this time, the optical fiber 301 surrounded with the melting solder 303 can be adjusted to be aligned to the laser chip 307. When the optical fiber 301 is properly adjusted, the solder 303 is solidified by stopping the current source 313 from providing current to the thermal pad 311. Thus, the optical fiber 301 aligned to the laser chip 307 is fixed on the substrate 305 by being secured with the solder 303.

A detailed description of the soldering technique employed for aligning a single mode optical fiber may be found, for example, in U.S. Pat. No. 6,146,025 to Abbink et al., the disclosure in its entirety is incorporated by reference herein.

Figure 4:
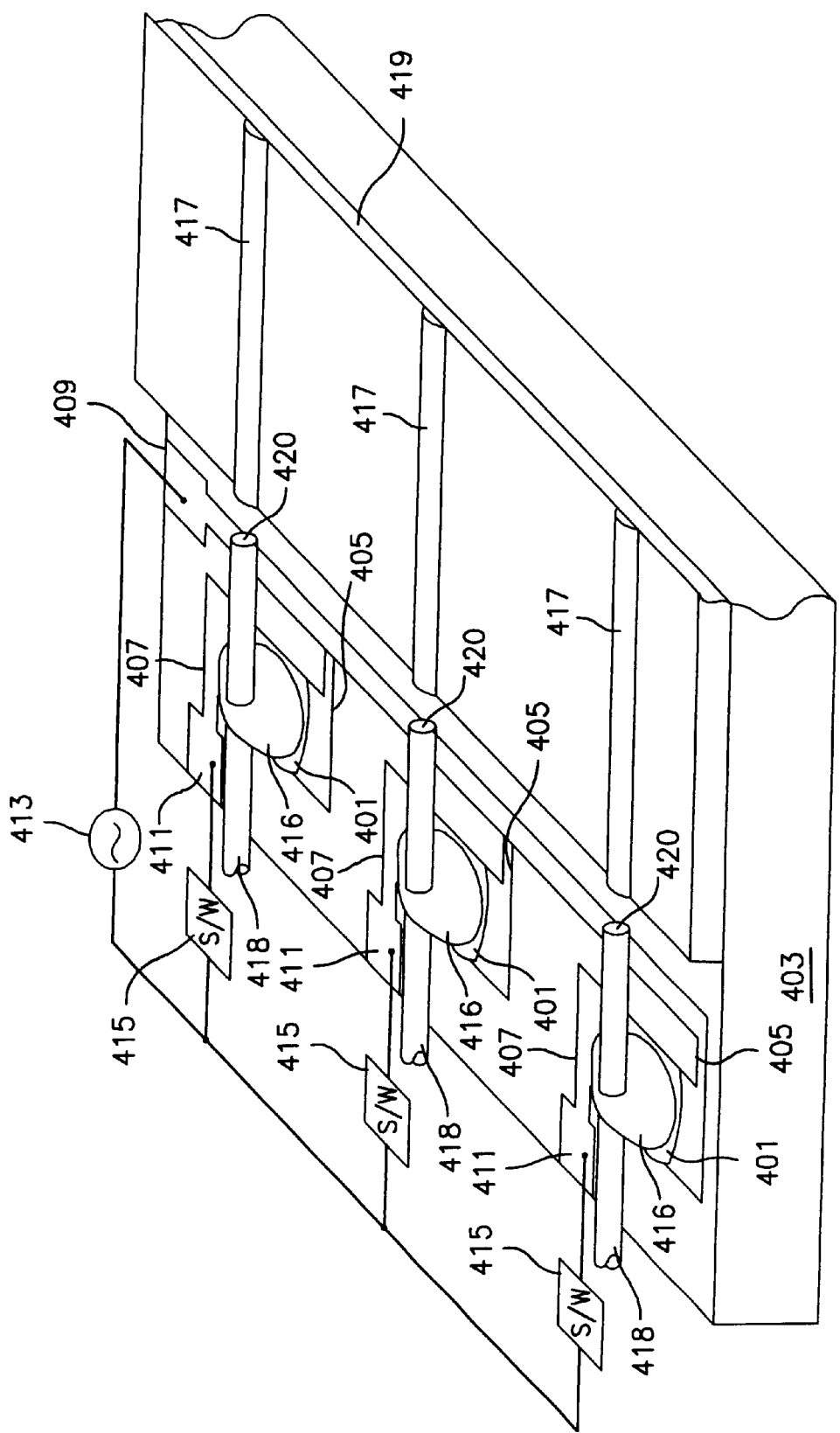
FIG. 4 is a perspective view of a multi-fiber alignment device.

Referring to FIG. 4, there is provided a perspective view of a multi-fiber alignment device of the present invention. As shown in FIG. 4, a plurality of thermal pads 401 are formed on the surface of a substrate 403. Each of the thermal pads 401 may be a resistive thin film which serves as a heater when current flows there through. The thermal pads 401 each have first and second contact rods 405, 407. The first contact rods 405 are connected to a common contact pad 409, and each of the second contact rods 407 is connected to a corresponding separate contact pad 411.

A current source 413 is connected to the common contact pad 409 and the respective separate contact pads 411 to provide current to the respective thermal pads 401. Switches 415 are connected between the current source 413 and the respective separate contact pads 411 to control the supply of current to the respective thermal pads 401 from the current source 413. It should be noted that the switches 415 may be any devices to control the supply of current between the common contact pad 409 and the respective first contact rods 405.

Solder 416 is deposited on each of the thermal pads 401. Optical fibers 418 are also placed on the respective thermal pads 401. The solder 416 may be deposited on the respective thermal pads 401 after placing the respective optical fibers 418 thereon, or the optical fibers 418 may be placed in the solder 416 previously deposited on the respective thermal pads 401. At the time of placing the optical fibers 418, the solder 416 may be melted so that the optical fibers 418 are movable in the solder.

Each optical fiber 418 is associated with an optical device. The optical fiber 418 may be aligned in a preferred position in relation to another device, for example, an optical waveguide, laser diode, another optical fiber, optical detector. In the example shown in FIG. 4 and FIG. 5, the optical fibers 418 transmit light from/to optical waveguides 417 arranged on a waveguide substrate 419. To maximize the efficiency of light transmission, each of the optical fibers should be accurately aligned to corresponding one of the waveguides 417. Preferably, a core 420 of each optical fiber is aligned to a corresponding waveguide 417.

When current is selectively provided from the current source 413 to the respective thermal pads 401, solder 416 deposited on the respective thermal pads 401 is melted by heat dissipated from the selected thermal pad(s) 401. For example, by controlling (i.e., turning on or off) the switches 415, current is provided to selected ones of the thermal pads 401. The selected thermal pads 401 are then actuated to dissipate heat into the solder 416 thereon. When the solder 416 on the selected thermal pads 401 is melted, the optical fibers 418 placed on the selected thermal pads 401 become adjustable to be aligned to the respective waveguides 417. When the selected optical fibers 418 are accurately aligned, the supply of current to the selected thermal pads 401 is stopped by controlling the switches 415, thus stopping the dissipation of heat into the solder 416. As a result, the solder 416 solidifies and the optical fibers 418 on the selected thermal pads are secured with the solder 416. Once being fixed on the thermal pads 401 in alignment with the waveguides 417, the optical fibers 418 and solder 416 are covered with a housing substrate (not shown).

Figure 5:
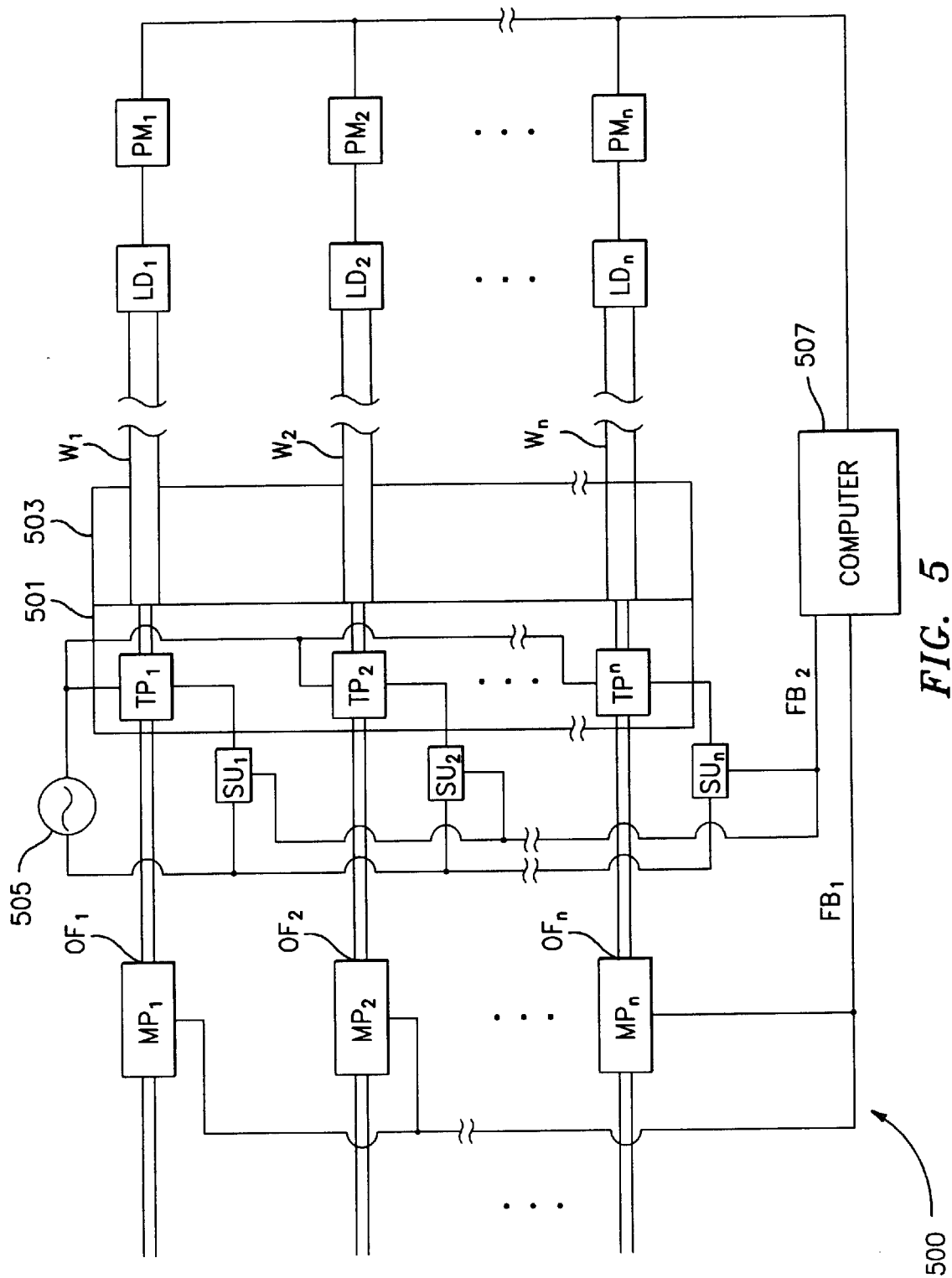
FIG. 5 is a block diagram of a multi-fiber adjusting system.

Referring to FIG. 5, a block diagram is provided for illustrating a multifiber adjusting system 500. On a substrate 501, a plurality of optical fibers $OF_1$–$OF_n$ are respectively held by solder deposited on a plurality of thermal pads $TP_1$–$TP_n$. The ends of the optical fibers $OF_1$–$OF_n$ are positioned adjacent to optical waveguides $W_1$–$W_n$, arranged on a waveguide substrate 503. The thermal pads $TP_1$–$TP_n$ are connected with switches $SW_1$–$SW_n$, respectively, each of which controls the supply of current from a current source 505 to corresponding one of the thermal pads $TP_1$–$TP_n$ in response to receiving a second feedback signal $FB_2$ from a computer 507.

The optical fibers $OF_1$–$OF_n$ are also associated with micro-positioners $MP_1$–$MP_n$, respectively, each of which adjusts the position of a corresponding optical fiber to be aligned to a corresponding waveguide in response to a first feedback signal $FB_1$ from computer 507. The first feedback signal FBI preferably includes data representing alignment status between each of the optical fibers $OF_1$–$OF_n$ and corresponding one of the waveguides $W_1$–$W_n$.

When the optical fibers $OF_1$–$OF_n$ are to be aligned with waveguides $W_1$–$W_n$, light is transmitted through one or more waveguides $W_1$–$W_n$, and the switch $SW_1$–$SW_n$ corresponding to the one or more optical fibers $OF_1$–$OF_n$ is activated by signal $FB_2$ to melt the solder. The light travels through the waveguides $W_1$–$W_n$ and is detected by light detectors $LD_1$–$LD_n$ disposed at the ends of the respective waveguides $W_1$–$W_n$. Power meters $PM_1$–$PM_n$ receive electrical signals indicative of the detected light from the respective light detectors $LD_1$–$LD_n$ and generate output data representing efficiency of the light transmission. The computer 507 receives the output data from the respective power meters $PM_1$–$PM_n$ and generates the first feedback signal $FB_1$ to the respective micro-positioners $MP_1$–$MP_n$. Each micro-positioner then adjusts an associated optical fiber according to the first feedback signal $FB_1$. Once a fiber is accurately positioned (e.g., once the fiber is positioned such that light detected at its associated light detector is maximized), the computer 507 provides a second feedback signal $FB_2$ to the respective switch $SW_1$–$SW_n$ so that the switch interrupts the supply of current to corresponding one of the thermal pads $TP_1$–$TP_n$. After the supply of current is interrupted, the solder on the corresponding one of the thermal pads $TP_1$–$TP_n$ solidifies, fixing the corresponding fiber in-place. Thus, in the embodiment in FIG. 5, each optical fiber is adjusted until being accurately aligned to a corresponding waveguide.

Referring again to FIG. 4, an alternative embodiment is described. The step of activating the thermal pads includes irradiating the thermal pad 401 with radiation to heat each thermal pad for 401, and in turn, heating bonding agent 416. The radiation source includes a coherent light source such as a laser, microwave radiation, or with focused infra-red light. The radiation source is focused on each pad and is generally depicted with a radiation arrow 430. The radiation source 430 heats the thermal pad 401 having bonding agent 416. When boding agent 416 used includes a low melting temperature glass instead of a solder, the low melting temperature glass has a softening point, the so-called glass transition temperature, which is substantially lower than the glass comprising the optical fiber, so that the optical fiber is unaffected by the increased temperature. The invention operates in the same fashion when using low melting temperature glass instead of solder. The thermal pads 401 are activated by radiation source 430 to melt the low melting temperature glass 416, the optical fiber being surrounded by the low melting temperature glass 416, the optical fibers being aligned, the thermal pads 401 being inactivated to allow the low melting temperature glass 416 to solidify, and the optical fibers thus being locked in a preferred position.

Having described preferred embodiments of an apparatus and method of aligning optical fibers to waveguides, modifications and variations can be readily made by those skilled in the art in light of the above teachings. It is therefore to be understood that, within the scope of the appended claims, the present invention can be practiced in a manner other than as specifically described herein.

What is claimed is:

1. A method for actively aligning optical fibers to optical devices, comprising the steps of:
    providing a base substrate on which the optical devices are arranged;
    forming on the base substrate thermal pads each of which is disposed in alignment with corresponding one of the optical devices;
    depositing a bonding agent on the respective thermal pads;
    selectively activating the thermal pads so that selected thermal pads generate heat to melt the bonding agent thereon;
    placing the optical fibers on the respective thermal pads, optical fibers on the selected thermal pads are surrounded by the melting bonding agent;
    adjusting the optical fibers on the selected thermal pads to be aligned to the respective optical device; and
    solidifying the bonding agent on the selected thermal pads by inactivating the heat directed to selected thermal pads.

2. The method of claim 1, further including housing the optical fibers secured with solidified bonding agent with an upper substrate.

3. The method of claim 1, wherein the selectively activating step includes providing current to the selected thermal pads each having a resistive element.

4. The method of claim 3, wherein the step of inactivating the selected thermal pads includes terminating supply of the current to the selected thermal pads.

5. The method of claim 4, wherein the selectively activating step further includes:
    providing electrical connections between a current source and the respective thermal pads; and
    controlling connection and disconnection of the electrical connections based on alignment status between each optical fiber and a corresponding optical device.

6. The method of claim 1, wherein the thermal pads are made of resistive thin film bonded onto the base substrate.

7. The method of claim 1, wherein the step of forming the thermal pads includes:
    forming heating pads on the base substrate;
    providing a first electrical connection between a current source and the respective heating pads, wherein the heating pads are commonly connected to the first electrical connection; and
    providing a second electrical connection between the current source and the respective heating pads, each of the heating pads being connected to the second electrical connection through a switching device.

8. The method of claim 7, wherein the selectively activating step includes selectively turning on switching devices respectively connected to the heating pads.

9. The method of claim 1, wherein the adjusting step includes aligning a core of each optical fiber to corresponding one of the optical devices.

10. The method of claim 1, wherein said optical device includes one of an optical waveguide, a laser diode, another optical fiber, an optical detector, and combinations including at least one of the forgoing.

11. The method of claim 1, wherein said bonding agent includes one of solder and low melting temperature glass, and combinations including at least one of the forgoing.

12. The method of claim 11, wherein the low melting temperature glass is a glass material with a glass transition temperature substantially lower than the glass transition temperature of the optical fibers.

13. The method of claim 1, wherein the selectively activating step includes providing radiation to the selected thermal pads.

14. The method of claim 13, wherein the radiation includes one of a coherent light source and microwave radiation.

15. The method of claim 13, wherein the step of inactivating the thermal pad includes terminating the radiation provided to selected thermal pads.

16. An apparatus for aligning a plurality of optical fibers to a plurality of optical devices, comprising:
    a base substrate;
    thermal pads formed on the top surface of the base substrate and in communication with a radiation source; and
    a bonding agent deposited on the respective thermal pads, wherein each of the optical fibers aligned to a corresponding optical devices is surrounded by the bonding agent on corresponding one of the thermal pads;
    wherein the radiation source in communication with the thermal pads melt the bonding agent thereon when the radiation source is activated to generate heat on the thermal pads.

17. The apparatus of claim 16, wherein each of the thermal pads is connected to a current source through a switching device for controlling supply of current to a corresponding thermal pad.

18. The apparatus of claim 17, further including:
    a common contact pad for providing a first electrical connection between a current source and the thermal pads which are commonly connected to the common contact pad; and
    a separate contact pad for providing a second electrical connection between the current source and each of the thermal pads, the second electrical connection is controlled by a switching device connected between the separate contact pad and the current source.

19. The apparatus of claim 18, wherein the switching devices are controlled to selectively connect or disconnect the second electrical connections based on alignment status between each optical fiber and a corresponding optical device.

20. The apparatus of claim 19, wherein each of the switching devices is turned on when a corresponding optical fiber is adjusted to be aligned to a corresponding optical device, and turned off when the corresponding optical fiber is aligned to the corresponding optical device.

21. The apparatus of claim 20, wherein a core of each of the optical fibers is aligned to corresponding one of the optical devices.

22. The apparatus of claim 16, further including an upper substrate for housing the aligned optical fibers surrounded by the bonding agent.

23. The apparatus of claim 16, further including:
    a plurality of positioners for adjusting positions of the respective optical fibers in response to a first feedback signal;
    a plurality of switches for controlling supply of current to the respective thermal pads in response to a second feedback signal;
    a plurality of light detectors associated with the respective optical devices, each of the light detectors detecting light transmitted through corresponding one of the optical devices;
    a plurality of power meters each for measuring the amount of light detected by corresponding one of the light detectors; and
    a computer for receiving outputs from the respective power meters and providing the first feedback signal to the respective positioners and the second feedback signal to the respective switches.

24. The apparatus of claim 23, wherein each of the positioners adjusts an associated optical fiber in response to the first feedback signal having data representing alignment status between the associated optical fiber and a corresponding optical device.

25. The apparatus of claim 23, wherein each of the switches is controlled by the second feedback signal having data representing alignment status between each optical fiber and a corresponding optical device.

26. The apparatus of claim 16, wherein said optical device includes one of an optical waveguide, a laser diode, another optical fiber, an optical detector, and combinations including at least one of the forgoing.

27. The apparatus of claim 16, wherein said bonding agent includes one of solder and low melting temperature glass, and combinations including at least one of the forgoing.

28. The apparatus of claim 27, wherein the low melting temperature glass is a glass material with a glass transition temperature substantially lower than the glass transition temperature of the optical fibers.

29. The apparatus of claim 16, wherein the radiation source includes each thermal pad in communication with a resistive unit selectively providing heat to the selected thermal pads.

30. The apparatus of claim 16, wherein the radiation source includes one of a coherent light source and microwave radiation.

31. The apparatus of claim 30, wherein the coherent light source includes one of a laser and an infra-red beam.

* * * * *